(12) United States Patent
Dittrich et al.

(10) Patent No.: US 9,131,438 B2
(45) Date of Patent: Sep. 8, 2015

(54) PRECISE TIME SYNCHRONIZATION OF NETWORK SUBSCRIBERS

(75) Inventors: Steffen Dittrich, Erlangen (DE); Harald Karl, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 211 days.

(21) Appl. No.: 13/877,091

(22) PCT Filed: Sep. 28, 2011

(86) PCT No.: PCT/EP2011/066856
§ 371 (c)(1),
(2), (4) Date: Mar. 29, 2013

(87) PCT Pub. No.: WO2012/041901
PCT Pub. Date: Apr. 5, 2012

(65) Prior Publication Data
US 2013/0201906 A1 Aug. 8, 2013

(30) Foreign Application Priority Data

Sep. 29, 2010 (DE) .................. 10 2010 041 675

(51) Int. Cl.
*H04W 56/00* (2009.01)
*H04J 3/06* (2006.01)
(Continued)

(52) U.S. Cl.
CPC ........... *H04W 56/0015* (2013.01); *G04R 20/02* (2013.01); *H04J 3/0644* (2013.01); *H04B 7/2125* (2013.01); *H04J 3/0667* (2013.01)

(58) Field of Classification Search
CPC . H04W 56/0015; H04J 3/0644; H04J 3/0667; H04B 7/2125
USPC .......................... 370/324; 342/357.43, 357.64
See application file for complete search history.

(56) References Cited

U.S. PATENT DOCUMENTS

| | | | | |
|---|---|---|---|---|
| 5,999,124 A | * | 12/1999 | Sheynblat | 342/357.29 |
| 6,356,555 B1 | * | 3/2002 | Rakib et al. | 370/441 |
| 2002/0003490 A1 | * | 1/2002 | Chang et al. | 342/357.01 |

(Continued)

FOREIGN PATENT DOCUMENTS

| | | |
|---|---|---|
| CN | 2755626 | 2/2006 |
| CN | 201436763 | 4/2010 |

(Continued)

OTHER PUBLICATIONS

International Search Report for PCT/EP2011/066856 mailed Dec. 16, 2011.
Chinese Office Action issued Dec. 24, 2014 in corresponding Chinese Patent Application No. 201180046648.7.

*Primary Examiner* — Afsar M Qureshi
(74) *Attorney, Agent, or Firm* — Staas & Halsey LLP

(57) ABSTRACT

Simple and robust precise time synchronization of network subscribers is provided by a system having at least one head station with a satellite antenna and a receiving station receiving a satellite signal containing time information. Also included is a station clock having a network connection for the synchronization of the network subscribers using a real time network protocol. An electronic system, arranged in the head station or the station clock, receives the time information from the satellite signal. A bidirectional communication infrastructure connects the head station and the station clock.

7 Claims, 1 Drawing Sheet

| (51) | Int. Cl. | |
|---|---|---|
| | *G04R 20/02* | (2013.01) |
| | *H04B 7/212* | (2006.01) |

(56) References Cited

U.S. PATENT DOCUMENTS

2008/0301727 A1* 12/2008 Cristofalo et al. .............. 725/35
2009/0231191 A1* 9/2009 Wu et al. .................. 342/357.09

FOREIGN PATENT DOCUMENTS

| CN | 101789627 | 7/2010 |
|---|---|---|
| CN | 201557118 | 8/2010 |
| CN | 101971557 | 2/2011 |

* cited by examiner

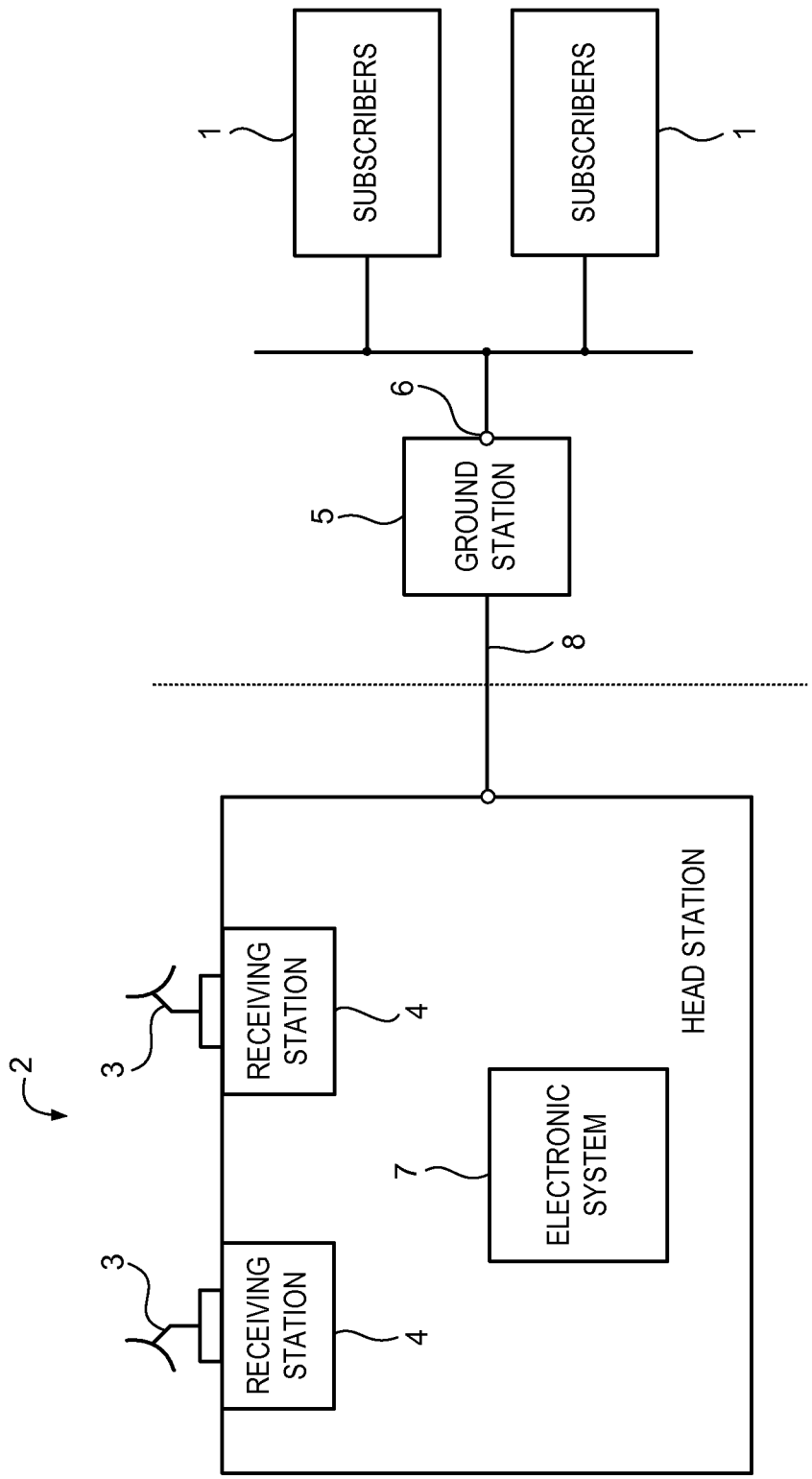

PRECISE TIME SYNCHRONIZATION OF NETWORK SUBSCRIBERS

CROSS REFERENCE TO RELATED APPLICATIONS

This application is the U.S. national stage of International Application No. PCT/EP2011/066856, filed Sep. 28, 2011 and claims the benefit thereof. The International Application claims the benefit of German Application No. 102010041675.4 filed on Sep. 29, 2010, both applications are incorporated by reference herein in their entirety.

BACKGROUND

Described below is a system for the precise time synchronization of network subscribers of a network based on satellites.

Such a system is intended for applications in which satellite systems such as, for example, the US's GPS system, Russia's GLONASS, China's COMPASS, Europe's GALILEO and other similar systems, are used to synchronize their use in relation to time, or reference time, using the time data available from these systems, it being possible for this synchronization of the system normally to take place via an Ethernet infrastructure. For many applications, the requirements are such that they require a precise reference time, and errors in synchronization lead to serious malfunctioning of the system as a whole. Also, such applications may be located in an environment where there is a high level of interference.

Until now, such systems for time synchronization based on satellites are achieved in two phases: a first phase consists of a satellite antenna and, if necessary, an integrated high frequency amplifier for the satellite signal. This phase is typically mounted externally. This signal is then fed inwards into the application via separate wiring (typically coaxial). A second phase is mounted internally (typically, in a switch cabinet). The satellite signal (in certain circumstances, amplified) is fed to it via the wiring. This phase contains the electronic system for capturing the required time from this signal, and either contains a network connection directly or makes available the time of another phase with a network connection. Synchronization of use was achieved via the network connection using network protocols. This being the case, the delay between phase 1 and phase 2 must be compensated for in order that the reference time be precise. In addition, EMC (electromagnetic compatibility) protection for the coaxial infrastructure is problematic. The usability of existing solutions as regards precision, reliability and interference resistance is currently the subject of research.

SUMMARY

Described below is a system that provides simple and more robust precise time synchronization of network subscribers compared to the solutions known in the state of the art. The system for the precise time synchronization of network subscribers of a network based on satellites includes at least one head station having a satellite antenna and a receiving station for capturing a satellite signal containing time information, a ground station having a network connection for the synchronization of the network subscribers using a real time network protocol, an electronic system arranged in the head station or the ground station for capturing the time from the satellite signal, and a bidirectional communication infrastructure between the head station and the ground station.

By replacing the coaxial connection path between the receiving station in the head station and the ground station with a bidirectional communication infrastructure it is possible to compensate precisely for the delay along the connection path. The bidirectional communication in such cases allows all possibilities for the compensation of delay using protocol mechanisms such as, for example, mechanisms that are the same as or comparable to the NTP (network time protocol) and the PTP (precise time protocol), or IEEE 1588. As a result, the more rigorous requirement for precise time synchronization, that the reference time given by two systems in two different places may under no circumstances exceed a maximum deviation of currently 1 μs, is fulfilled. In addition, the coaxial infrastructure is no longer required for the satellite signal and can be replaced by a more robust infrastructure.

In an advantageous embodiment the communication infrastructure is embodied as Ethernet infrastructure. Field assembly for Ethernet infrastructure is achieved excellently by the actual distribution process. Coaxial infrastructure is typically delivered preassembled and is thus very inflexible in response to individual requirements.

With coaxial infrastructure, significant restrictions exist with regard to admissible levels of attenuation, and thus with regard to achievable distances, due to the operating frequency of the satellite signals. Greater distances are only possible through outlay on more expensive wiring or additional devices (amplifiers). Ethernet infrastructure is advantageous here, as distances that comply with standards (100 m for 100Base-T) that are sufficient in many applications can be achieved.

Coaxial infrastructure is also more sensitive with regard to EMC. Such systems are either not readily available and/or have a high error risk. In time-sensitive applications, systems based on Ethernet are superior to classic coaxial systems.

Ethernet infrastructure also has better properties in relation to galvanic separation than coaxial infrastructure, which in Ethernet infrastructure is achieved by of transformers. Coaxial infrastructure, on the other hand, has no implicit galvanic separation.

The necessary precision here is provided by special use of the high bandwidths achievable with Ethernet, i.e. the solution described herein benefits from the high bandwidths not as regards processing speed but as regards the highly temporal position of reference markers (e.g. edges) that are necessarily present, without which the high bandwidths would not be achievable at all.

In another advantageous embodiment the communication infrastructure is embodied as DSL infrastructure. DSL (digital subscriber line), or SH DSL (single-pair high-speed DSL), provides wired technology for digital wide area networks. The most important features of this technology are the high transmission speed (currently up to 2.3 Mb/s per two-wire line) and high interference resistance with the simplest of wiring by comparison (simple copper two-wire line) as a result of appropriate integrated line coding, and the high distances achievable (currently up to 6 km). The infrastructure may use SH DSL circuits on both sides of the path and simple, inexpensive wiring (for example, shielded, twisted or AWG 26 two-wire lines). These circuits are well established on the telecommunications market and provide the high bandwidths and robust line coding in ready-to-use form. Their use therefore obviates the need for extremely research-intensive quests for comparable structures, especially as regards line coding.

In the system described herein the head station integrates the electronic system and the software necessary for satellite reception and for the operation of the (SH) DSL path. Rather than phase 1, as described above, it is the head station here that is directly mounted externally. Head station and ground station are connected by the (SH) DSL path, via which symmetrical, bidirectional communication is possible, as a result of which it is possible to compensate precisely for any delay. Here too, the necessary precision is provided by special use of the high bandwidths, i.e. the solution benefits here, as well, from the highly temporal position in time of reference markers that are necessarily present. Within the system, the ground station makes the necessary time signals (for example, reference impulses and protocols) available to the network subscribers. With suitable hardware and software architecture, it can obtain the reference time from the (SH) DSL path.

(SH) DSL is particularly suitable for the communication infrastructure because symmetrical, bidirectional communication is possible. As a result, it is possible to compensate precisely for any delay. Also, the incidence of precision-related hardware faults (steepness of edges and jitter) is very low and the line coding is suitable for an environment susceptible to interference. This permits communication over long distances that are far greater than those possible with Ethernet infrastructure and simple wiring ("telephone wires") can be used. The (SH) DSL infrastructure has the galvanic separation implied by the use of transformers.

In a further advantageous embodiment the communication infrastructure has protocol mechanisms for increasing data security. These protocol mechanisms (data redundancy, ECC [error correcting code or error checking and correction], etc.) further increase transmission reliability and thus the EMC stability of the otherwise sensitive path. This is possible because data volume is not an issue during use, i.e. data that is redundant several times over can, for example, be transmitted with customary ECCs or even its own ECC.

In another advantageous embodiment at least two satellite technologies are implemented in the head station, the at least two satellite signals here being correlatable. The fact that it is possible to implement different satellite technologies (for example GPS and GLONASS) in a single head station significantly increases protection against errors, through diversification. Classic structures would in this case need phase 1 as described above and the transmission path twice as much. The implementation of several satellite technologies here makes any external attempt at interference (for example, targeted beaming in of a satellite signal) very difficult. This is because a signal for both (or several) technologies would have to be generated in such a way that software correlating the two signals with one another in the head station and implementing various plausibility phases would be circumvented.

In a further advantageous embodiment at least one satellite technology is implemented orthogonally in the head station, the at least two orthogonal satellite signals here being correlatable. The fact that it is possible to implement the satellite technologies orthogonally (i.e. twisted in relation to the preferred direction of reception) in a single head station, with the result that they do not operate identically, also significantly increases protection against errors. This can be achieved through intrinsic mechanical structure. Classic structures would in this case need both phase 1 as described above and the transmission path would need twice as many precise setup instructions.

In another advantageous embodiment it is possible at least selectively to shield the head station against electromagnetic interference radiation. In this embodiment, the mechanical construction of the head station can be such that it is selectively protected to a high degree against EMC, as it is normally mounted externally. This means, for example, that although the head station's reception lobe is only directed toward the satellite (i.e. skywards) it is shielded to a high degree against more acute angles of incidence.

BRIEF DESCRIPTION OF THE DRAWINGS

These and other aspects and advantages will become more apparent and more readily appreciated from the following description of the exemplary embodiment, taken in conjunction with the accompanying drawings of which:

FIG. 1 is a block diagram of a system for precise time synchronization.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 shows a system for the precise time synchronization of network subscribers 1 with a head station 2 and a ground station 5 having a network connection 6 for the synchronization of the network subscribers 1 using a real time network protocol. Head station 2 and ground station 5 are connected to a bidirectional communication infrastructure 8. Two different satellite technologies, for example GPS and GLONASS, are implemented in the head station 2 by of two satellite antennae 3. As a result, any external attempt at interference (for example, targeted beaming in of a satellite signal) is very difficult. This is because a signal for both technologies would have to be generated in such a way that software correlating the two signals with one another in the head station 2 and implementing various plausibility phases would be circumvented. The head station 2 has a receiving station 4 for each satellite antenna 3. The electronic system 7 for capturing the time from the satellite signal is also housed here but, alternatively, could also be arranged in the ground station 5.

The head station 2 can be mounted externally (to the left of the dotted line) and advantageously can be connected to a ground station 5 via a DSL connection 8. In this way, the typically coaxial connection between the satellite receiving system, which is mounted externally, and a known time server, which is mounted internally (typically, in a switch cabinet), is no longer required. Symmetrical, bidirectional communication makes it is possible to compensate precisely for any delay. In addition, the incidence of precision-related hardware faults (steepness of edges and jitter) is very low and the line coding is also suitable for an environment susceptible to interference. It is also possible to employ protocol mechanisms (data redundancy, ECC, etc.) to increase transmission reliability and thus also the EMC stability of the normally sensitive path. All in all, a robust system for precise time synchronization is obtained.

In summary, the system provides precise time synchronization of network subscribers of a network based on satellites. In order to offer more simple and more robust precise time synchronization of network subscribers compared to the solutions known from the prior art, a system is proposed that includes at least one head station having a satellite antenna and a receiving station for capturing a satellite signal containing time information, a ground station having a network connection for the synchronization of the network subscribers using a real time network protocol, an electronic system arranged in the head station or the ground station for capturing the time from the satellite signal, and a bidirectional communication infrastructure between the head station and the ground station.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A system for precise time synchronization, based on satellites, for network subscribers of a network, comprising:
    at least one head station having a satellite antenna and a receiving station connected to the satellite antenna receiving a satellite signal containing time information;
    a ground station having a network connection to the network subscribers and providing time synchronization using a real time network protocol;
    an electronic system, in one of the head station and the ground station, receiving the time information from the satellite signal; and
    a bidirectional communication infrastructure, between the head station and the ground station, allowing compensation of delay along a connection path between the ground station and the receiving station in the head station.

2. The system as claimed in claim 1, wherein the communication infrastructure is an Ethernet infrastructure.

3. The system as claimed in claim 1, wherein the communication infrastructure is embodied as DSL infrastructure.

4. The system as claimed in claim 3, wherein the communication infrastructure has protocol mechanisms providing data security.

5. The system as claimed in claim 4, wherein the head station includes at least two satellite technologies providing at least two satellite signals, containing time information, that are correlatable.

6. The system as claimed in claim 5, wherein at least one satellite technology is orthogonally implemented in the head station.

7. The system as claimed in claim 6, wherein the head station is shielded at least selectively against electromagnetic interference radiation.

\* \* \* \* \*